United States Patent [19]

Brault et al.

[11] Patent Number: 5,083,559

[45] Date of Patent: Jan. 28, 1992

[54] ARTIFICIAL RESPIRATION BREATHING DEVICE

[76] Inventors: Richard Brault; Dianne Croteau; Jonathan Vinden, all of 8 Clarence Square, Toronto, Ontario, Canada, M5V 1H1

[21] Appl. No.: 239,500

[22] Filed: Sep. 1, 1988

[30] Foreign Application Priority Data

Sep. 3, 1987 [CA] Canada .................................. 546106

[51] Int. Cl.⁵ ............................................. A61M 16/00
[52] U.S. Cl. ............................ 128/202.28; 128/200.24
[58] Field of Search .................... 128/202.28, 202.29, 128/203.11, 200.24

[56] References Cited

U.S. PATENT DOCUMENTS 2,904,898  9/1959  Marsden ...................... 128/202.28
3,068,590  12/1962  Padellford .................. 128/202.28

FOREIGN PATENT DOCUMENTS 270640   5/1965  Australia ...................... 128/202.28
1207372  2/1960  France ......................... 128/202.29

OTHER PUBLICATIONS

"These Lessons May Save Someone's Life", by Brian Porter; The Spectator.
Actar News.

Primary Examiner—Edgar S. Burr
Assistant Examiner—Aaron J. Lewis
Attorney, Agent, or Firm—Nixon & Vanderhye

[57] ABSTRACT

An artificial respiration teaching device having in combination a hollow plastic head having mouth and throat openings, an inflatable bag removeably attached about the throat opening and adapted to receive air blown into the mouth of the head and through the throat.

8 Claims, 3 Drawing Sheets

ARTIFICIAL RESPIRATION BREATHING DEVICE

FIELD OF THE INVENTION

This invention relates to artificial respiration and in particular to a device for teaching artificial respiration to students.

SUMMARY OF THE INVENTION

Artificial respiration is an important aspect of the teaching program in first aid courses and swimming courses.

One of the most popular methods of artificial respiration involves blowing air from the lungs of the rescuer into the lungs of the victim. Since this method requires mouth-to-mouth contact between the rescuer and the victim, it is sometimes difficult to teach the technique in a class. Students may object to taking the course if it requires them to make mouth-to-mouth contact with other students who may be strangers to them. As a result, artificial respiration dolls have been used to help students overcome the social embarrassment associated with mouth-to-mouth contact with a stranger.

Accordingly, it has become common place to use a doll to initiate students to the concepts of the mouth-to-mouth artificial respiration technique. Since the types of dolls which have been developed for teaching tend to be expensive, it is common place for each student to take a turn practicing the technique on the doll. Where many students use the same doll, it is most important that the doll be cleaned between uses to avoid the transmission of viruses and germs between the students. Methods of cleaning such dolls have been developed but there is another problem which remains unsolved, that is, even if the doll is perfectly clean, it may not be perceived to be clean by the students in the course or by prospective students about to enroll in such a course. Concerns about the transmission of diseases is of increasing concern. Persons who may not appear to be ill and who may not know that they are ill may be carriers of debilitating or even fatal diseases. As a result, it is perceived that there is increasing reluctance of students to enroll in courses or to participate in exercises that require them to expose themselves to real or imagined risks of disease transmission.

It is an object of this invention to provide a device for use in teaching artificial respiration which may be produced at sufficiently low cost that each student may be provided with his or her own device.

It is a further object of this invention to provide an artificial respiration device which is adaptable to simulate the lung capacity of an adult, adolescent or child.

It is also an object of this invention to provide an artificial respiration device which may be used in a pool to simulate the teaching of mouth-to-mouth resuscitation of a person in the water.

The invention comprises a plastic head having a mouth opening and a neck opening;

an inflatable bag, removeably attached about the neck opening and adapted to receive air blown into the mouth of the head and through the neck opening;

a flow constricting device in the neck opening adapted to resist the flow of air through the neck opening.

It is preferred that the head be provided with a nose opening having two nostrils so that the student can simulate pinching the nose closed while blowing air into the mouth. It is also preferred that the head have a flat portion at the back to teach the student to rock the head back to open the throat of the victim.

The bag which receives the air may be attached to the neck by means of an elastic fitted about the bag and the neck.

The neck portion may have a groove about its circumference to receive the bag and the elastic. The capacity of the bag may be adjusted by placing the elastic about the bag at different intervals along the bag's length.

BRIEF DESCRIPTION OF THE DRAWINGS

In the preferred embodiment of this invention, which is illustrated in the figures.

DETAILED DESCRIPTION OF A PREFERRED EMBODIMENT

In the figures which illustrate this invention, like numerals indicate like elements.

Figure 1:
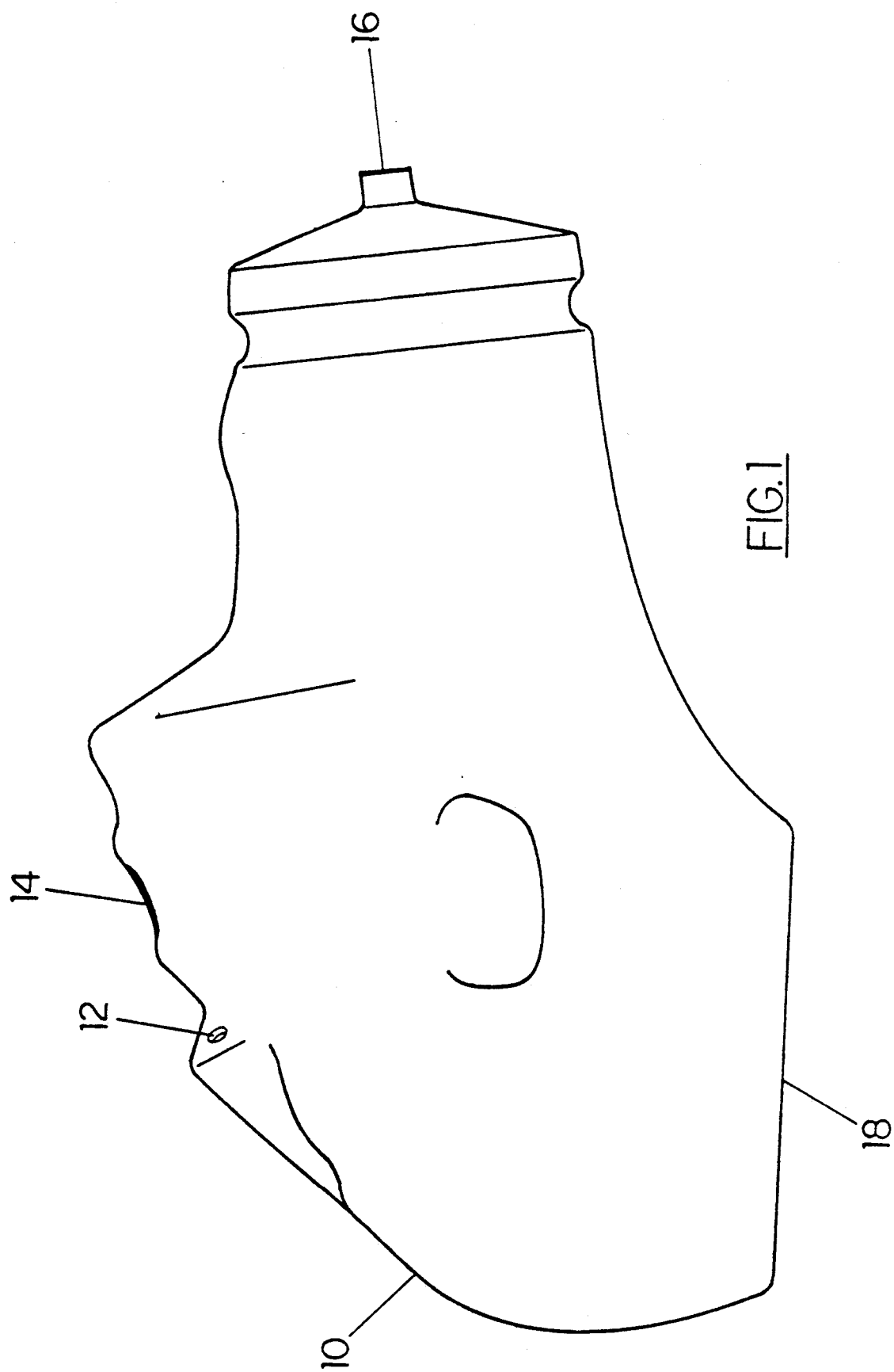
FIG. 1 is a side view of the head of the preferred embodiment of this invention.

Referring to FIG. 1, the head (10) is a hollow plastic shell having openings for nostrils (12), (14) and a throat (16) which communicates with the interior of the hollow plastic head (10). The head (10) also as a flat portion (18) at the back of the head to permit the head to be rocked back and held firmly in the rock-back position. Because of the intercommunication of the openings of the nostrils (12), the mouth (14) and the throat (16), air may be blown into the mouth (14) to exhaust either through the nostrils (12) or the throat (16). Accordingly, a student blowing into the mouth should plug the nostrils (12) in order to direct the air through the throat opening (16).

The throat opening (16) is attenuated to a small diameter by comparison to the opening of the mouth in order to help constrict the flow of air thereby simulating the reverse back pressure of a lung. It will be understood by those skilled in the art that a number of different means may be used to constrict the flow through the throat area. All such means are within the scope of this invention. As an example of such means, in FIG. 2, the throat opening (16) is shown to have a screw-on attachment (20) which is adapted to constrict the flow of air through the throat (16). This is an alternative embodiment which permits the flow constriction device to be changed in size to simulate different back pressures for adults or children.

Figure 2:
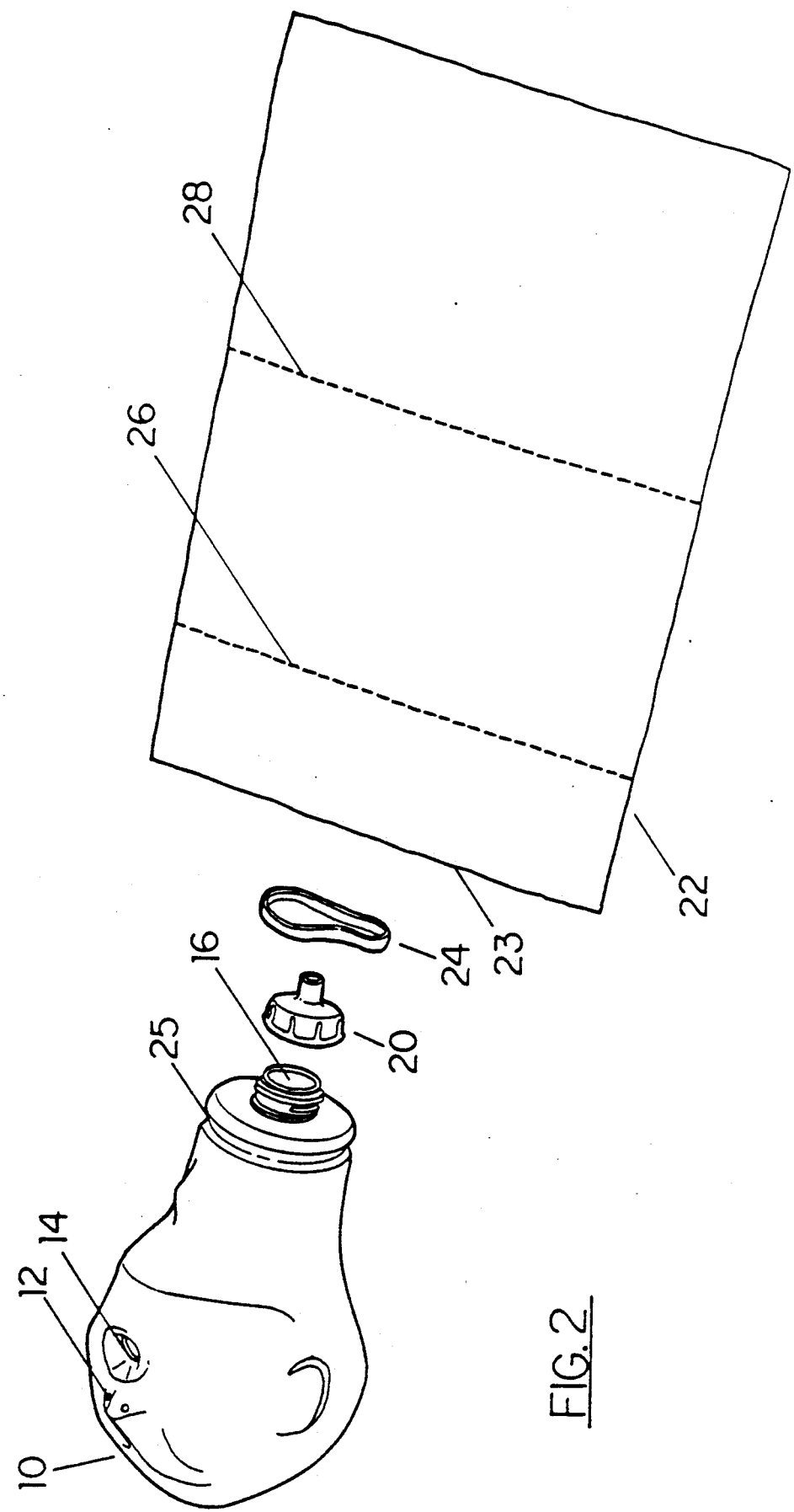
FIG. 2 is an exploded view of the components of the preferred embodiment of this invention.

Also illustrated in FIG. 2 is the lung bag (22) and fastening elastic (24). The lung bag is adapted to fit over the neck portion of the head (10) with elastic (24) outside the bag (22) to fasten the bag (22) into the neck groove (25). Markings (26) and (28) are presented on the lung bag (22) to illustrate where the elastic should be fastened in order to simulate the lung size of an adult or a child.

Figure 3:
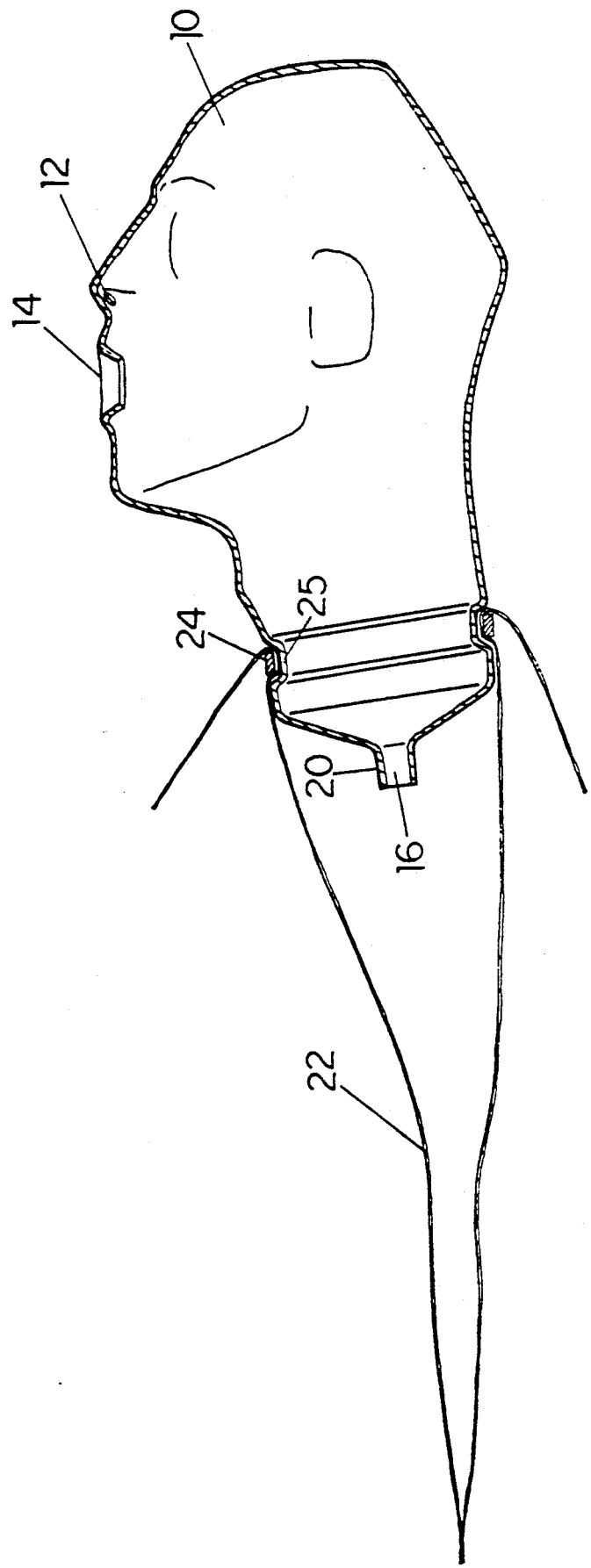
FIG. 3 is a side view of the components of the combination of the preferred embodiment of this invention fastened together.

As illustrated in FIG. 3, the lung bag is fitted over the neck groove (25) with the elastic band (24) securing the bag to the neck groove. In operation, a student fits together the components of the doll, as illustrated in FIG. 3, then follows through the procedure of artificial respiration including tilting the head back to lie on the flat portion (18), pinching the nose and blowing into the mouth to inflate the bag (22) through the throat (16).

The device in its combined form is water-tight except for the nostril and mouth openings (12) and (14), respectively, and therefore may be used by students in the water as well as on the side of the pool or on the beach.

It will be understood by those skilled in the art of mouth-to-mouth resuscitation that this doll is intended for teaching basic concepts and fundamentals of the procedure. It will also be appreciated that the simplicity of the device and the low cost of the materials will enable it to be supplied to each student taking a course so that there will be no necessity for more than one student to use the same doll. Students may purchase a doll as part of the tuition fee for taking the course and when they complete the course they may keep the doll for practice at home or simply dispose of it.

The embodiments of the invention in which an exclusive property and privilege is claimed are defined as follows:

1. An artificial respiration teaching device having in combination a hollow plastic head having mouth and throat openings; an inflatable bag removeably attached about the throat opening and adapted to receive air blown into the mouth of through the throat; and wherein the head has a flat portion at the back adapted to permit the head to be rocked back on a flat surface to simulate the head tilting procedure commonly used to open the throat of a victim.

2. The invention of claim 1 having a flow constricting device in the neck opening adapted to resist the flow of air through the neck opening.

3. A device as recited in claim 2 further comprising means defining a circumferential groove at the throat, and an elastic band for cooperation with said groove to hold said inflatable bag against the throat, in said groove, to removably attach said bag to said head about the throat opening.

4. The invention of claim 2 having nostril openings in communication with the interior of the hollow head.

5. The invention of claim 1 having nostril openings in communication with the interior of the hollow head.

6. A device as recited in claim 5 further comprising means defining a circumferential groove at the throat, and an elastic band for cooperation with said groove to hold said inflatable bag against the throat, in said groove, to removably attach said bag to said head about the throat opening.

7. A device as recited in claim 1 further comprising means defining a circumferential groove at the throat, and an elastic band for cooperation with said groove to hold said inflatable bag against the throat, in said groove, to removably attach said bag to said head about the throat opening.

8. An artificial respiration teaching device having in combination a hollow plastic head having mouth and throat openings; an inflatable bag removeably attached about the throat opening and adapted to receive air blown into the mouth of through the throat; and means defining a circumferential groove at the throat, and an elastic band for cooperation with said groove to hold said inflatable bag against the throat, in said groove, to removably attach said bag to said head about the throat opening.

* * * * *